United States Patent [19]
Horwood

[11] Patent Number: 5,868,194
[45] Date of Patent: Feb. 9, 1999

[54] METHOD OF INVESTMENT CASTING AND A METHOD OF MAKING AN INVESTMENT CASTING MOULD

[75] Inventor: Dominic J. Horwood, Derby, England

[73] Assignee: Rolls-Royce plc, London, England

[21] Appl. No.: 787,857

[22] Filed: Jan. 23, 1997

[51] Int. Cl.⁶ .............................. B22C 9/00; B22D 46/00
[52] U.S. Cl. ...................... 164/456; 164/122.2; 164/516
[58] Field of Search ......................... 164/4.1, 456, 122.1, 164/122.2, 516

[56] References Cited

U.S. PATENT DOCUMENTS 5,234,047  8/1993  Rose .

FOREIGN PATENT DOCUMENTS

| 0 655 667 | 5/1995 | European Pat. Off. . |
| 41 24 961 | 7/1991 | Germany . |
| 4 15761 | 4/1992 | Japan . |
| 0 427 0467 | 9/1992 | Japan . |
| 1 394 872 | 5/1975 | United Kingdom . |
| 1 486 326 | 9/1977 | United Kingdom . |
| 2 067 546 | 7/1981 | United Kingdom . |
| 2 150 875 | 7/1985 | United Kingdom . |

*Primary Examiner*—Kuang Y. Lin
*Attorney, Agent, or Firm*—Cushman Darby & Cushman Intellectual Property Group of Pillsbury Madison & Sutro LLP

[57] ABSTRACT

A method of making an investment casting mould comprises producing a CAD definition of a turbine blade, and determining the distribution of isosurfaces of constant temperature around the CAD definition of the at least one article if the external surface of the CAD definition of the at least one article was at a high temperature (Thigh). One of the isosurfaces of constant temperature is selected to define the external shape and the thickness of an investment casting mould. A pattern of the turbine blade is produced from the CAD definition of the turbine blade. The investment casting mould is made with an internal shape defined by the pattern of the turbine blade and an external shape and thickness distribution defined by the selected isosurface of constant temperature. The pattern is then removed from the investment casting mould.

37 Claims, 8 Drawing Sheets

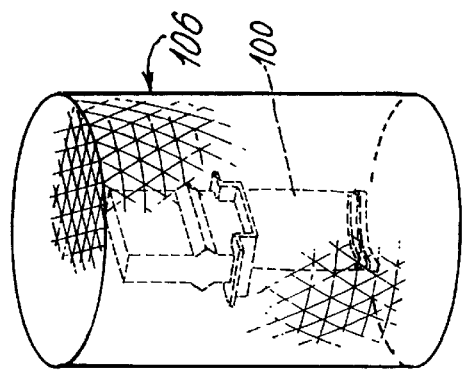
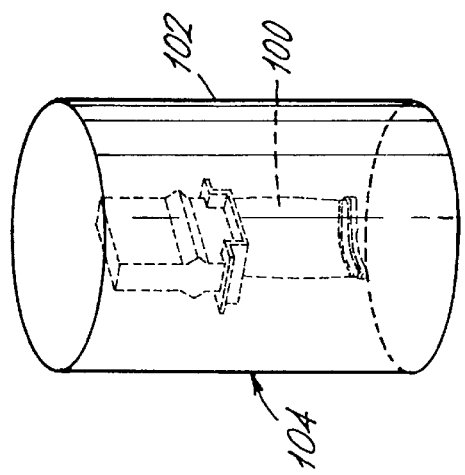
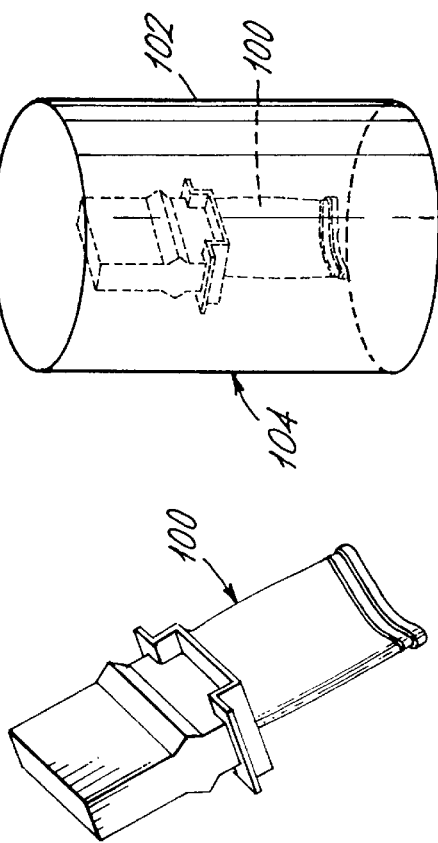
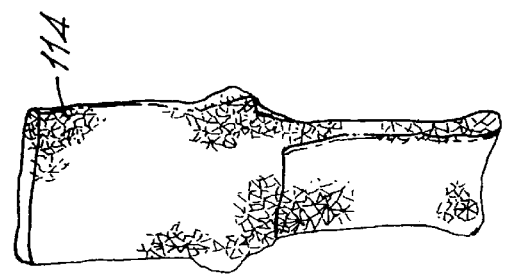
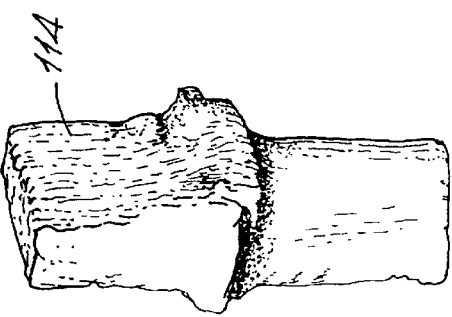
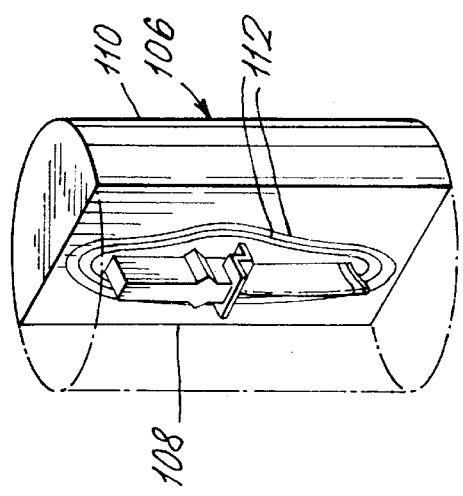

METHOD OF INVESTMENT CASTING AND A METHOD OF MAKING AN INVESTMENT CASTING MOULD

BACKGROUND OF THE INVENTION

The present invention relates to a method of investment casting, and to a method of making an investment casting mould. The invention is particularly relevant to the casting of articles by directional solidification, and more particularly to the casting of single crystal articles.

In the investment casting process, or lost wax casting process as it is sometimes called, a wax pattern of an article, or component, is produced. The wax pattern is produced by injecting wax into an accurately formed die. The wax pattern is a replica of the article to be produced. Usually a number of wax patterns are assembled together on a wax gating tree to form a cluster or wax mould assembly. The wax mould assembly is immersed in a liquid ceramic slurry which quickly gels after draining. Strengthening refractory granules are sprinkled over the ceramic slurry covered wax mould assembly and the refractory granules bond to the slurry coating to produce a ceramic layer on the wax mould assembly. This process is repeated several times to produce many ceramic layers which have a total thickness of about ¼ inch (6 mm) to ½ inch (12 mm) on the wax mould assembly. The wax is then melted out leaving a ceramic shell mould having an internal cavity identical in shape to that of the original wax mould assembly. This ceramic shell mould is called an investment casting mould. The mould is fired at a high temperature between 950° C. and 1100° C. to remove all traces of residual wax, and cure the ceramic shell mould. The ceramic shell mould is then transferred to a casting furnace, which may be operated at either vacuum conditions or at atmospheric conditions. A charge of molten metal is poured into the ceramic shell mould and the mould is allowed to cool to room temperature, after which the ceramic shell mould is removed leaving the cast article or articles. The ceramic shell mould may be cooled by applying a temperature gradient across the ceramic shell mould to directionally solidify the metal in order to produce columnar grains, or single crystals in the finished article or articles.

It is also known to produce resin patterns using stereolithography, rather than making wax patterns in a die. The advantage of using stereolithography is that it enables the patterns to be produced quickly for development purposes. The resin patterns are produced by directing a beam of focused radiation into a bath of liquid resin which is locally cured and solidified by the radiation. The beam of radiation is moved under computerised control to produce a resin pattern of the article to be produced. The resin pattern is then coated with ceramic slurry as discussed above to produce the ceramic shell mould. However, for production purposes resin patterns are not smooth enough for production quality articles and stereolithographic production of resin patterns is slow and expensive compared to the production of wax patterns by wax injection into a die.

The immersing, or dipping, of the wax mould assembly in the ceramic slurry is a relatively uncontrolled process. The build up of ceramic material is governed by the adhesion of the ceramic material onto the wax mould assembly. Random features such as drips and runs are common. In particular, the ceramic shell is thicker on concave external surfaces than on convex external surfaces of the wax mould assembly. In general the article features are blurred, sharp edges are blunted, fillet radii are enlarged, surfaces are smoothed and bridges may form between completely separate areas of the wax mould assembly. The thickness and external shape of the ceramic shell mould control the heat transfer out of the molten metal during the casting process.

It is necessary to have a mathematical description of the external surface of the ceramic shell mould. This description may be derived by running a mathematical model that simulates the build-up of ceramic on the article, for use in process models of the investment casting process to produce defect free cast articles.

There is currently no mathematical model of the external surface of the ceramic shell mould which simulates variation in the ceramic shell thickness with variations in the curvature of the external surface of the article. Furthermore there is currently no mathematical model of the external surface of the ceramic shell mould which simulates bridging between completely separate areas of the ceramic shell mould.

SUMMARY OF THE INVENTION

The present invention seeks to provide a mathematical model that may be used to generate a mathematical description of the external surface of an investment casting mould which more closely resembles real life than currently available mathematical models.

The present invention seeks to provide a method of investment casting which uses the mathematical description of the external surface of an investment casting mould.

The present invention provides a method of investment casting comprising the steps of:

(a) producing a CAD definition of at least one article to be produced, (b) determining the distribution of isosurfaces of a constant physical property around the CAD definition of the at least one article if the external surface of the CAD definition of the at least one article was held at a predetermined physical property value, (c) selecting one isosurface of a constant physical property value to define the external shape and the thickness of an investment casting mould, (d) making a pattern of the at least one article to be produced from the CAD definition of the at least one article, (e) making the investment casting mould with an internal shape defined by the pattern of the at least one article to be produced and an external shape and thickness distribution defined by the selected isosurface of constant physical property value, (f) removing the pattern from the investment casting mould, (g) pouring molten metal into the investment casting mould, (h) solidifying the molten metal in the investment casting mould to produce the at least one article, (i) removing the at least one article from the investment casting mould.

Preferably the physical property is temperature.

Preferably step (b) comprises performing a heat transfer analysis by analysing the transfer of heat between the external surface of the CAD definition of the at least one article and a nominal boundary surface spaced from and enclosing the CAD definition of the at least one article.

Preferably step (d) comprises producing the pattern by injecting wax into a die.

Alternatively step (d) may comprise producing the pattern by stereolithography from a resin.

Preferably the CAD definition comprises a plurality of articles to be produced interconnected by a runner system.

Preferably step (e) comprises producing the investment casting mould by repeatedly dipping the pattern in a ceramic slurry.

Alternatively step (e) comprises producing the investment casting mould by making a mould to define the external shape of the investment casting mould and injecting a ceramic slurry into a space between the pattern and the mould. The mould may be made by stereolithography from a resin.

Preferably step (h) comprises producing a temperature gradient across the investment casting mould to directionally solidify the molten metal.

Preferably step (h) comprises selecting a single crystal of metal to grow into the investment casting mould.

Preferably step (e) comprises making a restriction in the investment casting mould to select a single crystal.

Preferably the CAD definition comprises a definition of a blade or a vane.

The present invention also seeks to provide a method of producing an investment casting mould which uses the mathematical description of the external surface of an investment casting mould.

The present invention also provides a method of making an investment casting mould comprising the steps of:
 (a) producing a CAD definition of at least one article to be produced,
 (b) determining the distribution of isosurfaces of a constant physical property around the CAD definition of the at least one article if the external surface of the CAD definition of the at least one article was held at a predetermined physical property value,
 (c) selecting one isosurface of constant physical property value to define the external shape and the thickness of an investment casting mould,
 (d) making a pattern of the at least one article to be produced from the CAD definition of the at least one article,
 (e) making the investment casting mould with an internal shape defined by the pattern of the at least one article to be produced and an external shape and thickness distribution defined by the selected isosurface of constant physical property value,
 (f) removing the pattern from the investment casting mould.

Preferably the physical property is temperature.

Preferably step (b) comprises performing a heat transfer analysis by analysing the transfer of heat between the external surface of the CAD definition of the at least one article and a nominal boundary surface spaced from and enclosing the CAD definition of the at least one article.

Preferably step (d) comprises producing the pattern by injecting wax into a die.

Alternatively step (d) comprises producing the pattern by stereolithography from a resin.

Preferably the CAD definition comprises a plurality of articles to be produced interconnected by a runner system.

Preferably step (e) comprises producing the investment casting mould by repeatedly dipping the pattern in a ceramic slurry.

Alternatively step (e) comprises producing the investment casting mould by making a mould to define the external shape of the investment casting mould and injecting a ceramic slurry into a space between the pattern and the mould. The mould may be made by stereolithography from a resin.

Preferably the CAD definition comprises a definition of a blade or a vane.

Preferably the external surface of the CAD definition of the at least one article is at a first temperature and the nominal boundary surface is at a temperature less than the first temperature.

The present invention also provides a method of investment casting comprising the steps of:
 (a) producing a CAD definition of a casting furnace,
 (b) producing a process model of the solidification of molten metal within an investment casting mould in the casting furnace,
 (c) producing a CAD definition of at least one article to be produced,
 (d) determining the distribution of isosurfaces of a constant physical property around the CAD definition of the at least one article if the external surface of the CAD definition of the at least one article was at a predetermined physical property value,
 (e) selecting one isosurface of a constant physical property value to define the external shape and the thickness of an investment casting mould,
 (f) supplying the CAD definition of the at least one article, the CAD definition of the casting furnace and the definition of the investment casting mould to the process model of the solidification of molten metal within an investment casting mould within the casting furnace,
 (g) using the process model to determine whether the solidification of molten metal within the definition of the investment casting mould in the CAD definition of the casting furnace will produce at least one cast article substantially without defects,
 (h) making a pattern of the at least one article to be produced from the CAD definition of the at least one article,
 (i) making the investment casting mould with an internal shape defined by the pattern of the at least one article to be produced and an external shape and thickness distribution defined by the selected isosurface of constant temperature,
 (j) removing the pattern from the investment casting mould,
 (k) pouring molten metal into the investment casting mould,
 (l) solidifying the molten metal in the investment casting mould to produce the at least one article,
 (m) removing the at least one article from the investment casting mould.

Preferably step (b) comprises providing a finite element thermal model of the casting process and solidification behaviour.

Preferably the physical property is temperature.

Preferably step (d) comprises performing a heat transfer analysis by analysing the transfer of heat between the external surface of the CAD definition of the at least one article and a nominal boundary surface spaced from and enclosing the CAD definition of the at least one article.

Preferably step (h) comprises producing the pattern by injecting wax into a die.

Step (h) may comprise producing the pattern by stereolithography from a resin.

Preferably the CAD definition comprises a plurality of articles to be produced interconnected by a runner system.

Preferably step (i) comprises producing the investment casting mould by repeatedly dipping the pattern in a ceramic slurry.

Alternatively step (i) comprises producing the investment casting mould by making a mould to define the external shape of the investment casting mould and injecting a ceramic slurry into a space between the pattern and the mould. The mould may be made by stereolithography from a resin.

Preferably step (l) comprises producing a temperature gradient across the investment casting mould to directionally solidify the molten metal.

Preferably step (l) comprises selecting a single crystal of metal to grow into the investment casting mould.

Preferably step (i) comprises making a restriction in the investment casting mould to select a single crystal.

Preferably the CAD definition comprises a definition of a blade or a vane.

The present invention will be more fully described by way of example with reference to the accompanying drawings, in which:

BRIEF DESCRIPTION OF THE DRAWINGS

FIGS. 7A, 7B, 7C, 7D, 7E and 7F show perspective views of stages in the production and selection of isosurfaces of constant temperature.

DETAIL DESCRIPTION OF THE INVENTION

Figure 1:
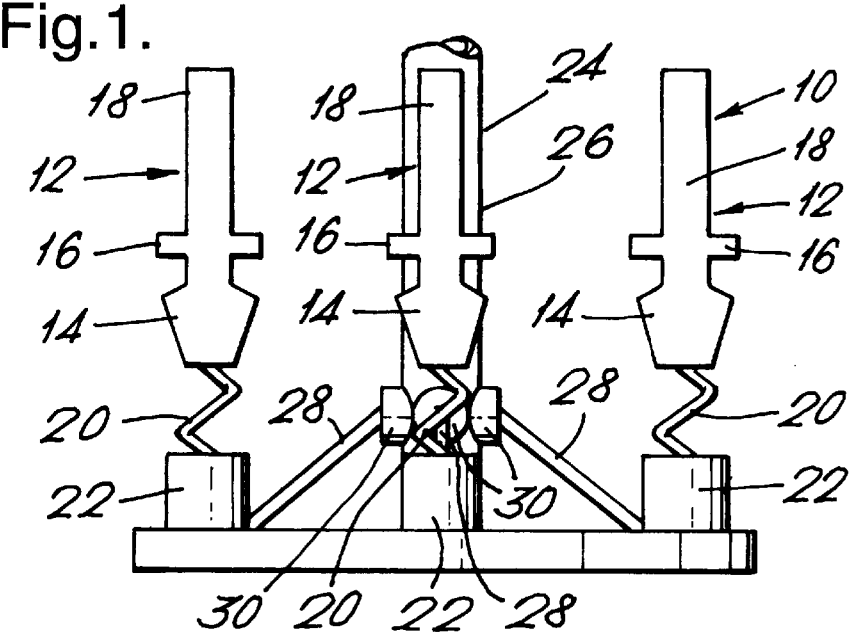
FIG. 1 is a view of a wax mould assembly.

A wax mould assembly 10, shown in FIG. 1, comprises a plurality of wax patterns 12 suitable for making turbine vanes or turbine blades for a gas turbine engine. Each of the wax patterns 12 has a first part 14, which defines the shape of the root of the resulting cast turbine blade, a second part 16, which defines the shape of the platform of the cast turbine blade and a third part 18, which define the shape of the aerofoil portion of the cast turbine blade. The turbine blades to be cast in this example are single crystal turbine blades and therefore an associated wax selector part 20 and wax starter part 22 are connected to each wax pattern 12. The wax selector part 20 is a wax helix, although other suitable wax selectors may be used.

The wax patterns 12 and associated wax selectors 20 and wax starters 22 are arranged together on a wax gating tree 24 to form the wax mould assembly 10. The wax gating tree 24 comprises a wax runner which includes a central downpole 26 and a plurality of feeders 28. The wax patterns 12 are arranged generally parallel to the central downpole 26 and the feeders extend generally radially from the central downpole 26 to the wax patterns 12. There are also filters 30 in the feeders 28.

As discussed previously the wax mould assembly 10, including the wax patterns 12 is immersed in liquid ceramic slurry and has refractory granules sprinkled on the gelling liquid ceramic slurry to produce a layer of ceramic. The process of immersing in liquid ceramic slurry and sprinkling with refractory granules is repeated until the thickness of ceramic is sufficient for the particular application. Thereafter the ceramic shell mould is dried and heated to remove the wax and then fired to purify and cure the ceramic shell mould.

Figure 2:
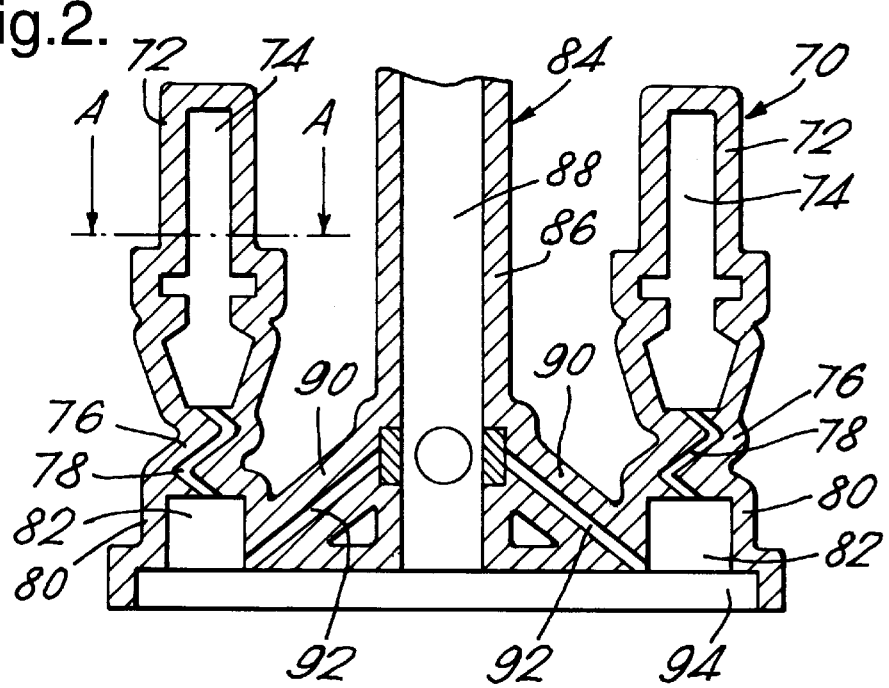
FIG. 2 is a cross-sectional view through a ceramic shell mould according to the present invention.

The finished ceramic shell mould 70 for casting a single crystal turbine blade made from the wax mould assembly is shown in FIG. 2. The ceramic shell mould comprised a plurality of article portions 72 each of which has an article chamber 74 to define the turbine blade. Each of the article portions also has an associated selector portion 76, which has a selector passage 78, and an associated starter portion 80 which has a starter chamber 82. The ceramic shell mould 70 also comprises a runner portion 84 to convey molten metal to the article portions 72 via the starter and selector portions 80 and 76. The runner portion 84 includes a single central portion 86 which has a main passage 88 and radial portions portions 80. The ceramic shell mould has a recess 94 which is arranged to fit on a chill plate during the single crystal casting process.

Figure 3:
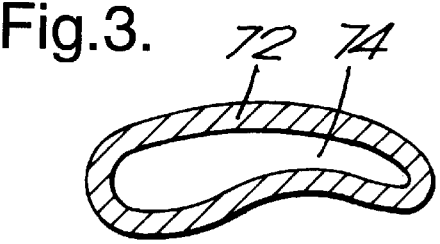
FIG. 3 is a cross-sectional view in the direction of arrows A—A in FIG. 2.

It may be seen from FIG. 3 that the portion of the ceramic shell mould 70 corresponding to the aerofoil portion of the turbine blade has a variation in the thickness of the ceramic shell mould 70. More specifically the ceramic shell mould 70 is thicker on the concave shaped surface than on the convex shaped surface.

When molten metal is poured into the ceramic shell mould 70, the molten metal flows through the main passage 88, the ceramic filters and the radial passages 92 to the starter chambers 82. The molten metal then flows upwardly through the starter chambers 82 and the selector passages 78 into the article chambers 74. In the single crystal casting process the open ends of the starter chambers 82 of the ceramic shell mould 70 are placed onto a chill plates located in the recess 94 of the ceramic shell mould 70. The chill plate causes solidification of the molten metal to occur, and the chill plate and ceramic shell mould 70 are withdrawn slowly from the casting furnace to produce directional solidification of the molten metal within the starter chambers 82 of the ceramic shell mould 70. The selector passages 78 select a single crystal from a plurality of directionally solidifying crystals in the starter chambers 82 of the ceramic shell mould 70.

Figure 4:
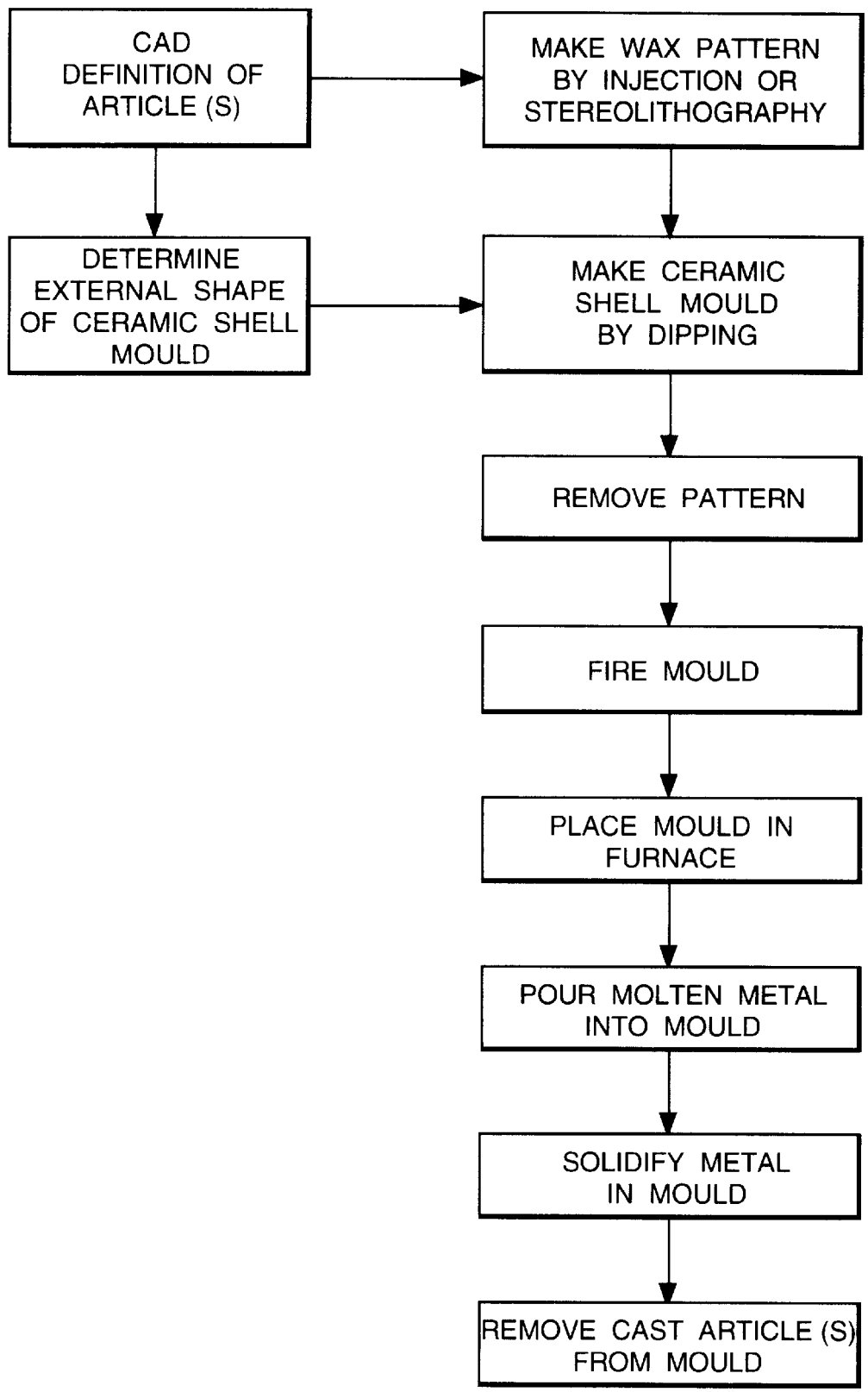
FIG. 4 is a block diagram of a method according to the present invention.
Figure 5A:
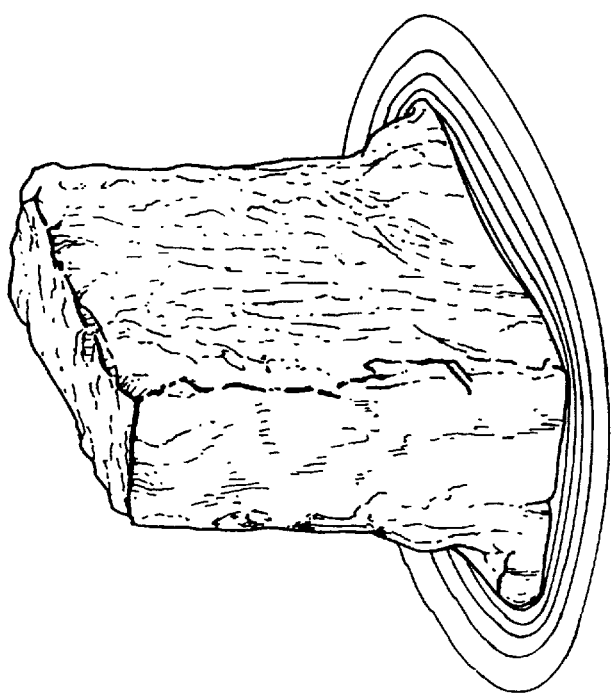
FIGS. 5A, 5B, 5C and 5D are perspective views of an article with isosurfaces of constant temperature shown around the article.
Figure 5B:
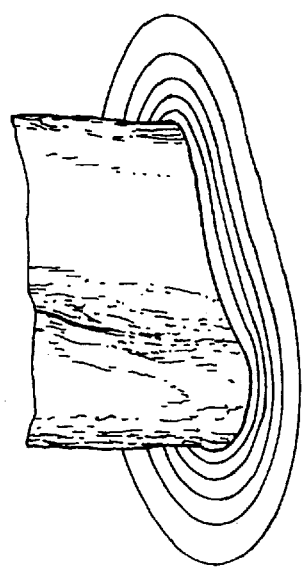
Figure 5C:
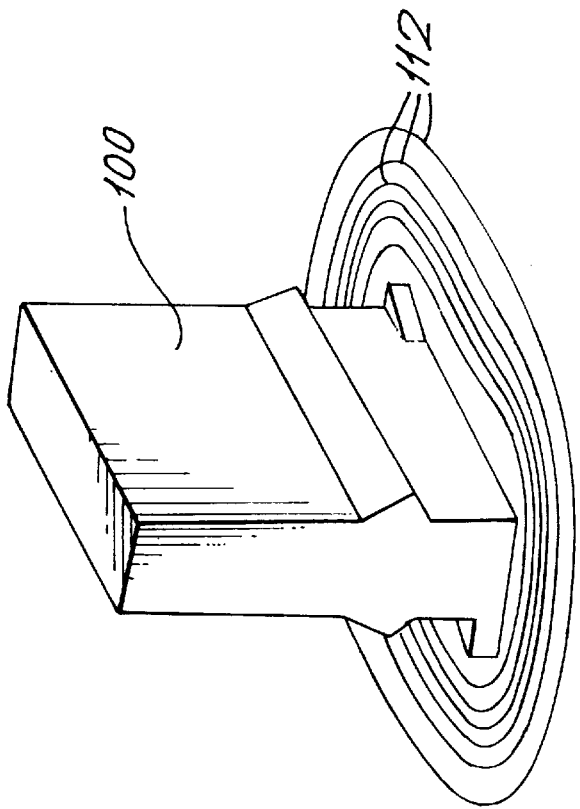
Figure 5D:
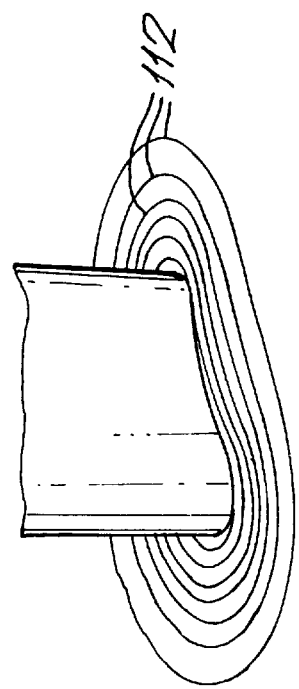
Figure 6A:
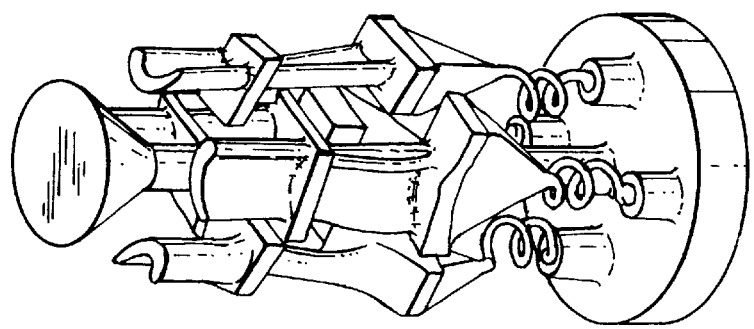
FIGS. 6A, 6B, 6C, 6D and 6E are perspective views of a wax mould assembly with ceramic shell moulds having different thicknesses corresponding to different isosurfaces of constant temperature.
Figure 6B:
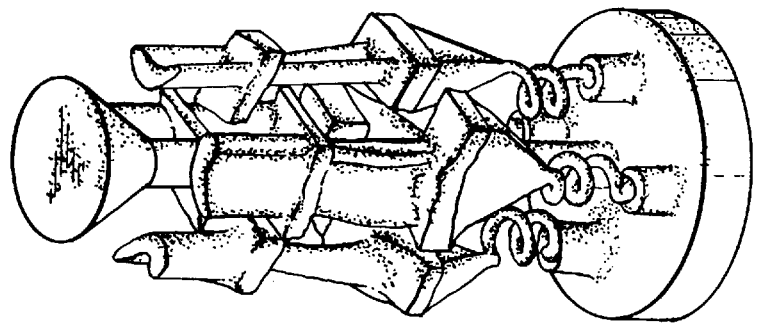
Figure 6C:
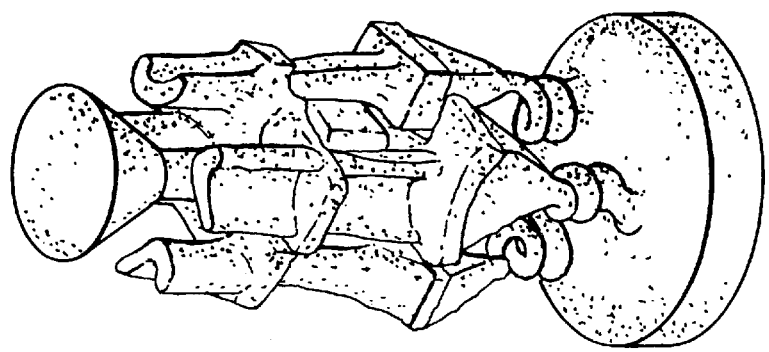
Figure 6D:
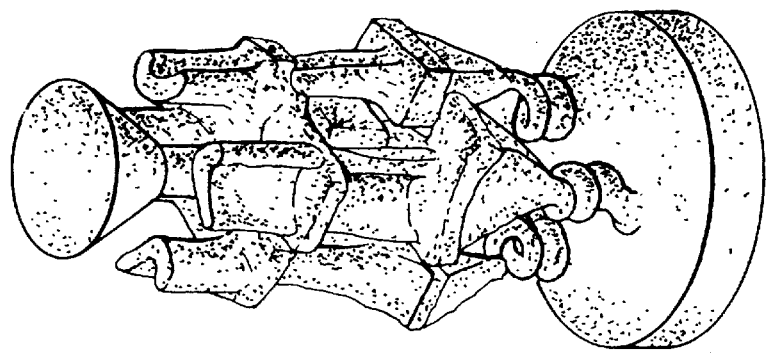
Figure 6E:
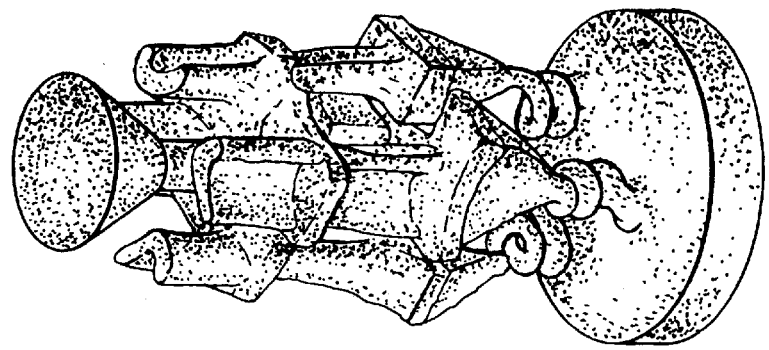

In one embodiment of the present invention, as shown with reference to FIG. 4, a three demensional CAD (computer aided design) definition of an article to be produced, for example a turbine blade, is produced. The CAD definition of the turbine blade is used as an input to a mathematical model which is used to determine the external shape and the thickness of the ceramic shell mould used for investment casting of the turbine blade.

More specifically, as shown in FIGS. 5A–5D, 6A–6E, 7A–7F, we perform a thermal heat transfer analysis using finite element technology. We simulate heat conduction from the external surface of the CAD definition of the article to some nominal surface spaced from and enclosing the CAD definition of the article, where the external surface of the CAD definition of the article is at a predetermined temperature and the nominal surface is at a temperature significantly cooler than the temperature at the external surface of the CAD definition of the article.

We then say that the external surface of the ceramic shell mould is defined by an isosurface of constant temperature, and thus the external shape of the ceramic shell mould is defined together with the thickness distribution of the ceramic shell mould. Thus as we move along a conduction heat flux vector away from the turbine blade, the ceramic shell mould thickness in that direction varies in proportion to the variation of temperature due to the heat flow. There is no process physics based link for this relationship, we have drawn an analogy between thermal conduction and the real ceramic build up behaviour. The concave surface of the turbine blade concentrates conductive heat flux like a lens reducing heat dissipation and causing the isosurfaces of constant temperature to be further apart, whereas the convex surface of the turbine blade causes the conductive heat flux to diverge increasing heat dissipation and causing the isosurfaces to be closer together.

It can be seen that the use of the isosurfaces of constant temperature results in the ceramic shell mould being thicker on the convex surface and thinner on the convex surface thus matching the real build up exhibited during the immersing technique. Furthermore it also produces bridging and smoothing out of features. The particlular isosurface of constant temperature is selected to produce the required thickness distribution of ceramic.

In practice as is shown in FIG. 7B, a CAD definition of a cylinder 102 is produced which is larger than, and encloses the CAD definition of the turbine blade 100. The CAD definition of the turbine blade 100 is substracted from the CAD definition of the cylinder 102 to produce a hollowed cylinder CAD definition 104, the internal surface of which corresponds to the external surface of the CAD definition of the turbine blade. A finite element mesh 106 is automatically generated from the CAD definition of the hollowed cylinder 104 as shown in FIG. 7C. Tetrahedral linear finite elements are used. The definition completely describes the hollowed cylinder by splitting the hollowed cylinder into a collection of small solid elements.

A high temperature boundary condition is applied to the internal surface 108 of the hollowed cylinder finite element (FE) mesh and a low temperature boundary condition is applied to the external surface 110 of the hollowed cylinder finite element (FE) mesh, as shown in FIG. 7D. These conditions are applied to enable and promote conductive heat flow through the hollowed cylinder in a radially outward direction. A finite element thermal conduction analysis is run until steady heat flow is achieved at which point there are an infinite number of isosurfaces of constant temperature 112 within the domain of the hollowed cylinder, shown more clearly in FIG. 5.

Here an isosurface of temperature 112 is a set of triangles where each triangle is generated as an intersection of a plane with a tetrahedron element where the plane defines a constant temperature boundary through that tetrahedron element.

One isosurface of temperature 112 is selected which gives the required thickness distribution of the ceramic mould 114, i.e. normal spatial deviation from the CAD definition of the article 100 to the isosurface of temperature 112 as shown in FIGS. 7E and 7F.

The thermal heat transfer analysis, isosurface of temperature selection and extraction are all completed using standard finite element tools.

The CAD definition of the turbine blade 100 is used to produce a pattern of the turbine blade, the CAD definition of the turbine blade 100 may be used to produce the dies used in the wax injection process for making the wax patterns. Alternatively the CAD definition of the turbine blade 100 may be used to produce stereolithography resin patterns by controlling a beam of radiation which cures the resin.

The ceramic shell mould 114 is produced with an internal shape defined by the pattern of the turbine blade 100 and an external shape and thickness defined by the selected isosurface of constant temperature 112. The ceramic shell mould 114 may be produced with the external shape defined by the selected isosurface of constant temperature 112 by controlling the number of times the pattern is immersed in the ceramic slurry. In this case the dipping process is calibrated to correlate the number of dips required to build up the ceramic shell mould to a thickness that approximates to the thickness defined by the isosurface of constant temperature. Alternatively the ceramic shell mould may be produced with an external shape defined by the selected isosurface of constant temperature 112 by a machining a ceramic block to the required external shape.

In FIGS. 5A–5D is shown a perspective view of a turbine blade 100 with isosurfaces of constant temperature 112, and FIG. 6 shows the effect on the thickness and external shape of the ceramic shell mould of selecting isosurfaces of different constant temperatures.

In another embodiment of the present invention, as shown in FIGS. 7A–7F, a method of investment casting is shown where a process model of investment casting process is used to ensure production of defect free cast articles. The process model is an advanced finite element thermal computer model that can be used to predict the casting process and solidification behaviour. A three dimensional CAD (computer aided design) definition of a casting furnace to be used for the investment casting process is produced. A three dimensional CAD (computer aided design) definition of an article to be produced, for example a turbine blade, is produced. The CAD definition of the turbine blade is used as an input to a mathematical model which is used to determine the external shape and the thickness of the ceramic shell mould used for investment casting of the turbine blade. A process model of molten metal solidification, particularly during directional solidification or single crystal formation, is produced. The three dimensional CAD definition of the casting furnace, the three dimensional CAD definition of the turbine blade and the definition of the external shape and thickness of the ceramic shell mould are used as inputs to the process model of the molten metal solidification process.

In order to determine the external shape and thickness of the ceramic shell mould we perform a thermal heat transfer analysis using finite element technology. We simulate heat conduction from the external surface of the CAD definition of the article to some nominal surface spaced from and enclosing the CAD definition of the article, where the external surface of the CAD definition of the article is at a predetermined temperature and the nominal surface is at a temperature significantly cooler than the temperature at the external surface of the CAD definition of the article.

We then say that the external surface of the ceramic shell mould is defined by an isosurface of constant temperature, and thus the external shape of the ceramic shell mould is defined together with the thickness distribution of the ceramic shell mould. The concave surface of the turbine blade concentrates conductive heat flux like a lens reducing heat dissipation and causing the isosurfaces of constant temperature to be further apart, whereas the convex surface of the turbine blade causes the conductive heat flux to diverge increasing heat dissipation and causing the isosurfaces to be closer together.

It can be seen that the use of the isosurfaces of constant temperature results in the ceramic shell mould being thicker on the convex surface and thinner on the convex surface thus matching the real build up exhibited during the immersing technique. Furthermore it also produces bridging and smoothing out of features. The particular isosurface of constant temperature is selected to produce is required thickness distribution of ceramic.

Again in practice, as discussed above with reference to FIGS. 5A–5D, 6A–6E, 7A–7F, a CAD definition of a cylinder 102 is produced which is larger than, and encloses the CAD definition of the turbine blade 100. The CAD definition of the turbine blade 100 is subtracted from the CAD definition of the cylinder 102 to produce a hollowed cylinder CAD definition 104, the internal surface of which corresponds to the external surface of the CAD definition of the turbine blade 100. A finite element mesh is automatically generated from the CAD definition of the hollowed cylinder 106. Tetrahedral linear finite elements are used. This definition completely describes the hollowed cylinder 106 by splitting the hollowed cylinder 106 into a collection of small solid elements.

A high temperature boundary condition is applied to the internal surface 108 of the hollowed cylinder finite element (FE) mesh 106 and a low temperature boundary condition is applied to the external surface 110 of the hollowed cylinder finite element (FE) mesh. 106. These conditions are applied to enable and promote conductive heat flow through the hollowed cylinder 106 in a radially outward direction. A finite element thermal conduction analysis is run until steady heat flow is achieved at which point there are an infinite number of isosurfaces of constant temperature 112.

An isosurface of temperature 112 is a set of triangles where each triangle is generated as an intersection of a plane with a tetrahedron element where the plane defines a constant temperature boundary through that tetrahedron element.

One isosurface of constant temperature 112 is selected which gives a certain thickness distribution of the ceramic mould 114 i.e. normal spatial deviation from the CAD definition of the turbine blade 100 to the isosurface of constant temperature 112.

The thermal heat transfer analysis, isosurface selection and extraction are all completed using standard finite element tools.

The temperatures of the isosurfaces of constant temperature are calibrated to correspond to the number of times that the wax pattern of the turbine blade is dipped into the ceramic slurry and hence the thickness of the ceramic shell mould.

The process model of the molten metal solidification process then uses the CAD definition of the furnace, the CAD definition of the turbine blade and the definition of the external shape and thickness of the ceramic shell mould as inputs and then determines if the selected definition of the external shape and thickness of the ceramic shell mould in conjunction with the shape of the turbine blade and the casting furnace will result in cast turbine blade substantially without defects.

If the process model of the molten metal solidification process determines that the cast turbine blade will be free from defects then the CAD definition of the turbine blade is used to produce a pattern of the turbine blade, the wax pattern is dipped in the ceramic slurry the appropriate number of times, corresponding to the selected isosurface of constant temperature to produce the selected definition of the external shape and thickness of the ceramic shell mould. Then the wax pattern is removed from the ceramic shell mould, and the ceramic shell mould is fired to strengthen the ceramic shell mould. The ceramic shell mould is then placed in the casting furnace, the molten metal is poured into the ceramic shell mould and the molten metal is solidified in the ceramic shell mould to produce the cast turbine blade. The turbine blade is then removed from the ceramic shell mould.

The CAD definition of the turbine blade may be used to produce the dies used in the wax injection process for making the wax patterns. Alternatively the CAD definition may be used to produce stereolithography resin patterns by controlling a beam of radiation which cures the resin.

The ceramic shell mould is produced with an internal shape defined by the pattern of the turbine blade and an external shape and thickness defined by the selected isosurface of constant temperature. The ceramic shell mould may be produced with the external shape defined by the selected isosurface of constant temperature by controlling the number of times the pattern is immersed in the ceramic slurry. In this case the dipping process is calibrated to correlate the number of dips required to build up the ceramic shell mould to a thickness that approximates the thickness defined by the selected isosurface of constant temperature. Alternatively the ceramic shell mould may be produced with an external shape defined by the selected isosurface of constant temperature by machining a ceramic block to the required external shape.

If the process model of the molten metal solidification process determines that the cast turbine blade will not be free from defects then during the determination of the external shape and thickness of the ceramic shell mould another isosurface of constant temperature is selected corresponding to a ceramic shell mould thickness either one dip thicker or one dip thinner. The process model of the molten metal solidification process is rerun to determine if the newly selected definition of the external shape and thickness of the ceramic shell mould in conjunction with the shape of the turbine blade and the casting furnace will result in cast turbine blade substantially without defects.

If a cast turbine blade without defects is produced the wax patterns and ceramic shell mould with the newly selected thickness is produced and the metal is cast in the mould. If a cast turbine blade with defects is produced then a new isosurface is selected and the process model is rerun to determine if the newly selected external shape and thickness of the ceramic shell mould will produce cast turbine blades substantially without defects.

The solidification process preferably includes providing a temperature gradient across the turbine blade to produce a directionally solidified, or single crystal, turbine blade. The temperature gradient may be produced by placing the ceramic shell mould on a cooled chill plate, and moving the chill plate so that the ceramic shell mould is gradually removed from the casting furnace.

Figure 9:
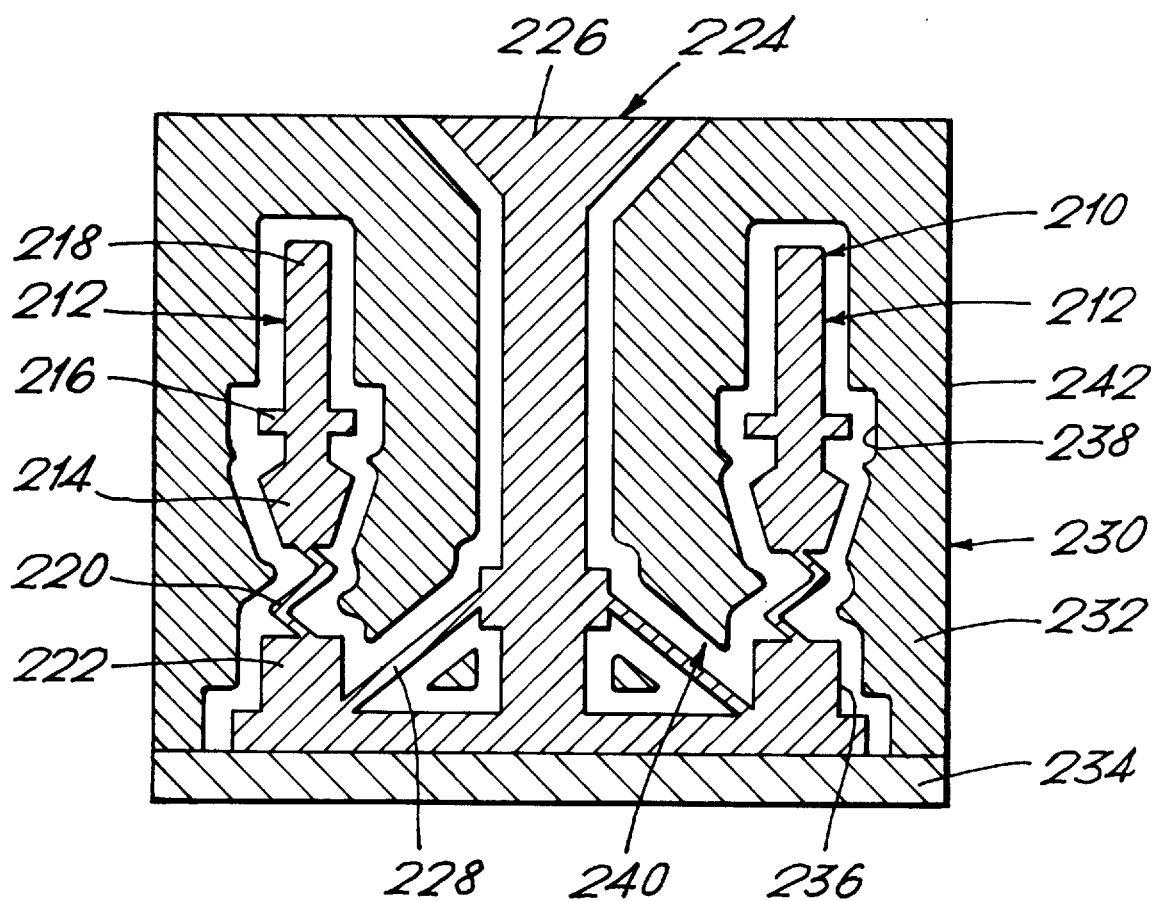
FIG. 9 is a cross-sectional view through a resin mould and resin pattern used to make a ceramic shell mould according to the present invention.
Figure 10:
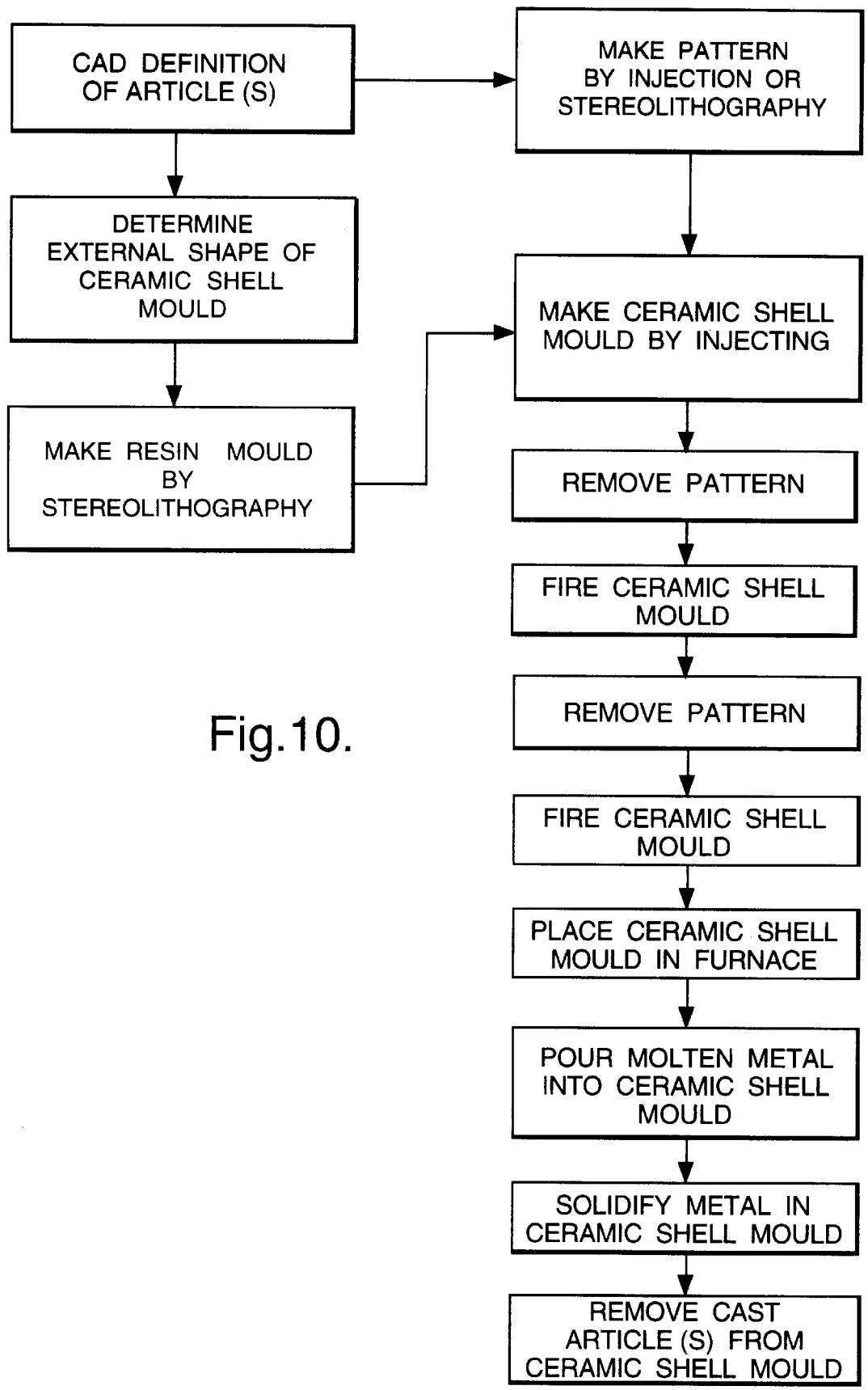
FIG. 10 is a block diagram of a further method according to the present invention.

A resin pattern assembly 210, shown in FIG. 9, comprises a plurality of resin patterns 212 suitable for making turbine vanes or turbine blades for a gas turbine engine. Each of the resin patterns 212 has a first part 214, which defines the shape of the root of the resulting cast turbine blade, a second part 216, which defines the shape of the platform of the cast turbine blade and a third part 218, which defines the shape of the aerofoil portion of the cast turbine blade. The turbine blades to be cast in this example are single crystal turbine blades and therefore an associated resin selector part 220 and resin starter part 222 are connected to each resin pattern 212. The resin selector part 220 is a resin helix, although other suitable resin selectors may be used.

The resin patterns 212 and associated resin selectors 220 and resin starters 222 are arranged together on a resin gating tree 224 to form a resin pattern assembly 210. The resin gating tree 224 comprises a resin runner which includes a central downpole 226 and a plurality of feeders 228. The resin patterns 212 are arranged generally parallel to the central downpole 226 and the feeders 228 extend generally radially from the central downpole 226 to the resin patterns 212.

A resin mould assembly 230, shown in FIG. 9, comprises a first resin mould part 232 and a second resin mould part 234. The resin mould assembly 230 is arranged around the resin pattern assembly 210 and is spaced from the resin pattern assembly 210 to form a chamber 240. A ceramic shell mould 70 similar to that shown in FIG. 2 is produced by injecting a ceramic slurry into the chamber 240 using a binderless, low pressure, low viscosity injection moulding process. The ceramic slurry comprises a mono sized particulate ceramic system highly dispersed in a relatively volatile dispersant fluid. The dispersant fluid is then sublimated and the injected ceramic is allowed to cure and solidify. A ceramic slurry which is suitable for such an injection moulding process is commercially available under the name 'CPS Quickset' (Trade Mark), and has the property of isotropic shrinkage on sintering, resulting in mechanical properties and dimensional consistency superior to that of conventional injection moulding.

When curing of the ceramic is complete, the resin mould assembly 230 is removed together with the inserts leaving a ceramic shell mould surrounding the resin pattern assembly 210. The ceramic shell mould is then dried. The resin pattern assembly 210 is then removed from the ceramic shell mould and the ceramic shell mould is fired. The ceramic shell mould is then tested for cracks before it is used for casting.

The resin pattern assembly 210 and the resin mould assembly 230 are produced by controlling a beam of radiation which cures the resin, ie the resin pattern assembly 210 and resin mould assembly 230 are produced by stereolithography. The resin pattern assembly 210 and resin pattern assembly 230 may be integral.

The CAD definition of the turbine blade 100 is used to produce the resin pattern assembly 210 by stereolithography by controlling the beam of radiation which cures the resin, and thus the internal shape 236 of the chamber 240 is defined by the CAD definition of the turbine blade. The external shape 238 and thickness of the chamber 240 is defined by the selected isosurface of constant temperature 112 and the selected isosurface of constant temperature 112 is used to produce the resin mould assembly 230 by stereolithography by controlling the beam of radiation which cures the resin. The ceramic shell mould 114 thus has an internal shape 236 defined by the pattern of the turbine blade 100 and an external shape and thickness defined by the selected isosurface of constant temperature 112.

Figure 8:
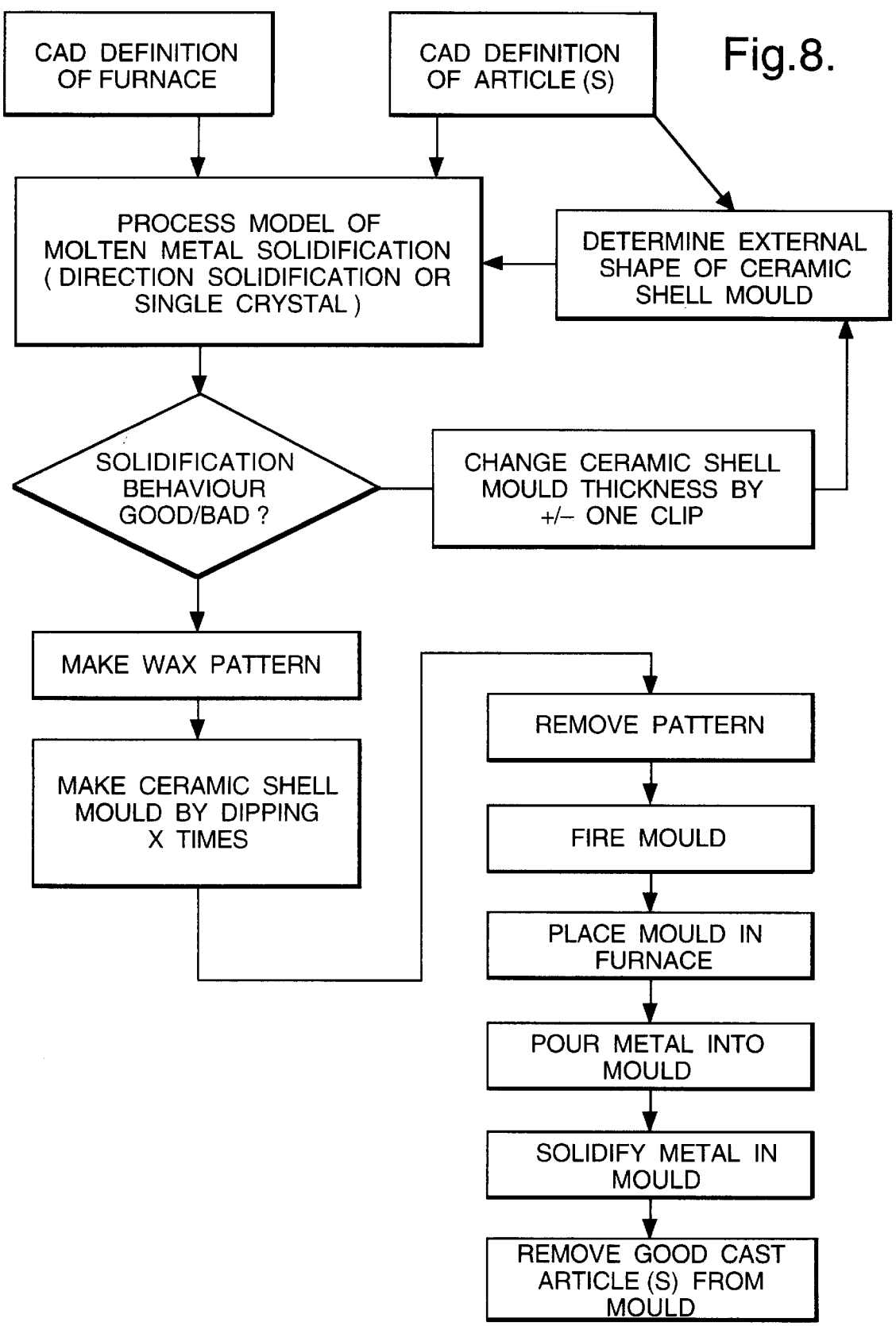
FIG. 8 is a block diagram of another method according to the present invention.

The use of stereolithography to produce a resin pattern assembly and resin mould assembly for producing a ceramic shell mould for investment casting has the advantage that it enables a substantial saving in development time and costs compared to the long development time and high costs involved in producing dies for wax patterns, and enables castings to be made in six days or less compared to about twenty weeks or more for conventional lost wax casting and the ceramic shell mould produced by this method mimics the ceramic shell mould produced by dipping so that the lessons learnt during the development can be applied to the dipped ceramic shell moulds. The resin pattern moulds are not sufficiently smooth and accurate to be used in production but provide sufficient accuracy for development purposes. The ceramic shell mould produced from the resin pattern assembly and resin mould assembly may be used in the method disclosed with reference to FIG. 8 but instead of producing the ceramic shell mould by dipping the ceramic shell mould is produced by injecting into a resin pattern and resin mould assembly and the thickness of the ceramic shell mould is varied accordingly to produce satisfactory castings.

Although the description has referred to turbine blades and turbine vanes it is equally applicable to other articles and components.

The novel and inventive feature of the present invention is the selection of the isosurface of constant temperature to define the external shape and thickness of the ceramic shell mould in order to produce a ceramic shell mould which more closely resembles those produced by dipping a wax pattern into a ceramic slurry.

Although we have used isosurfaces of constant temperature produced by heat conduction, it is equally possible to use isosurfaces of constant temperature produced by heat radiation or heat convection.

Similarly it is also within the scope of this invention to use other physical properties instead of temperature to select the shape and thickness of the ceramic shell mould. For example it may be possible instead of producing a thermal gradient across the hollow cylinder to produce a pressure gradient across the hollow cylinder and to determine where the isosurfaces of constant stress are, and to select one of the isosurfaces of constant stress to define the outer surface of the ceramic shell mould. It is possible to use any other suitable physical property which is directional and has a flux and to determine isosurfaces of constant physical property values, and select one of the isosurfaces of constant physical property value.

I claim:

1. A method of investment casting comprising the steps of:
   (a) producing a CAD definition of at least one article to be produced,
   (b) determining the distribution of isosurfaces of a constant physical property around the CAD definition of the at least one article if the external surface of the CAD definition of the at least one article was held at a predetermined physical property value,
   (c) selecting one isosurface of the constant physical property value to define the external shape and the thickness of an investment casting mould,
   (d) making a pattern of the at least one article to be produced from the CAD definition of the at least one article,
   (e) making the investment casting mould with an internal shape defined by the pattern of the at least one article to be produced and an external shape and thickness distribution defined by the selected isosurface of constant physical property value,
   (f) removing the pattern from the investment casting mould,
   (g) pouring molten metal into the investment casting mould, (h) solidifying the molten metal in the investment casting mould to produce the at least one article, (i) removing the at least one article from the investment casting mould.

2. A method as claimed in claim 1 wherein the physical property is temperature.

3. A method as claimed in claim 2 wherein step (b) comprises performing heat transfer analysis by analyzing the transfer of heat between the external surface of the CAD definition of the at least one article and a nominal boundary surface spaced from and enclosing the CAD definition of the at least one article.

4. At method as claimed in claim 1, wherein step (d) comprises producing the pattern by injecting wax into a die.

5. A method as claimed in claim 1, wherein step (d) comprises producing the pattern by stereolithography from a resin.

6. A method as claimed in claim 1, wherein the CAD definition comprises a plurality of articles to be produced interconnected by a runner system.

7. A method as claimed in claim 1 wherein step (e) comprises producing the investment casting mould by repeatedly dipping the pattern in a ceramic slurry.

8. A method as claimed in claim 1 wherein step (e) comprises producing the investment casting mould by making a mould to define the external shape of the investment casting mould and injecting a ceramic slurry into a space defined between the pattern and the mould.

9. A method as claimed in claim 8 comprising making the mould by stereolithography from a resin.

10. A method as claimed in claim 1 wherein step (h) comprises producing a temperature gradient across the investment casting mould to directionally solidify the molten metal.

11. A method as claimed in claim 8 wherein step (h) comprises selecting a single crystal of metal to grow into the investment casting mould.

12. A method as claimed in claim 9 wherein step (e) comprises making a restriction in the investment casting mould to select a singly crystal.

13. A method as claimed in claim 1 wherein the CAD definition is selected from the group consisting of a definition of a blade and a definition of a vane.

14. A method of making an investment casting mould comprising the steps of:
   (a) producing a CAD definition of at least one article to be produced,
   (b) determining the distribution of isosurfaces of a constant physical property around the CAD definition of the at least one article if the external surface of the CAD definition of the at least one article was held at a predetermined physical property value,
   (c) selecting one isosurface of the constant physical property value to define the external shape and the thickness of an investment casting mould,
   (d) making a pattern of the at least one article to be produced from the CAD definition of the at least one article,
   (e) making the investment casting mould with an internal shape defined by the pattern of the at least one article to be produced and an external shape and thickness distribution defined by the selected isosurface of constant temperature,
   (f) removing the pattern from the investment casting mould.

15. A method as claimed in claim 14 wherein the physical property is temperature.

16. A method as claimed in claim 15 wherein step (b) comprises performing heat transfer analysis by analysing the transfer of heat between the external surface of the CAD definition of the at least one article and a nominal boundary surface spaced from and enclosing the CAD definition of the at least one article.

17. A method as claimed in claim 14 wherein step (d) comprises producing the pattern by injecting wax into a die.

18. A method as claimed in claim 14 wherein step (d) comprises producing the pattern by stereolithography from a resin.

19. A method as claimed in claim 14 wherein the CAD definition comprises a plurality of articles to be produced interconnected by a runner system.

20. A method as claimed in claim 14 wherein step (e) comprises producing the investment casting mould by repeatedly dipping the pattern in a ceramic slurry.

21. A method as claimed in claim 14 wherein step (e) comprises producing the investment casting mould by making a mould and injecting a ceramic slurry into a space defined between the pattern and the mould.

22. A method as claimed in claim 21 comprising making the mould by stereolithography from a resin.

23. A method as claimed in claim 14 wherein the CAD definition is selected from the group consisting of a definition of a blade and a definition of a vane.

24. A method of investment casting compromising the steps of:
   (a) producing a CAD definition of a casting furnace,
   (b) producing a process model of the solidification of molten metal within an investment casting mould in the casting furnace,
   (c) producing a CAD definition of at least one article to be produced,
   (d) determining the distribution of isosurfaces of a constant physical property around the CAD definition of the at least one article if the external surface of the CAD definition of the at least one article was held at a predetermined physical property value,
   (e) selecting one isosurface of the constant physical property value to define the external shape and the thickness of an investment casting mould,
   (f) supplying the CAD definition of the at least one article, the CAD definition of the casting furnace and the definition of the investment casting mould to the process model of the solidification of molten metal within an investment casting mould within the casting furnace,
   (g) using the process model to determine whether the solidification of molten metal within the definition of the investment casting mould in the CAD definition of the casting furnace will produce at least one cast article substantially without defects.
   (h) making a pattern of the at least one article to be produced from the CAD definition of the at least one article.
   (i) making the investment casting mould with an internal shape defined by the pattern of the at least one article to be produced and an external shape and thickness distribution defined by the selected isosurface of constant physical property value,
   (j) removing the pattern from the investment casting mould,
   (k) pouring molten metal into the investment casting mould,
   (l) solidifying the molten metal in the investment casting mould to produce the at least one article, (m) removing the at least one article from the investment casting mould.

25. A method as claimed in claim 24 wherein the physical property is temperature.

26. A method as claimed in claim 25 wherein step (d) comprises performing heat transfer analysis by analysing the transfer of heat between the external surface of the CAD definition of the at least one article and a nominal boundary surface spaced form and enclosing the CAD definition of the at least one article.

27. A method as claimed in claim 24 wherein step (h) comprises producing the pattern by injecting wax into a die.

28. A method as claimed in claim 25 wherein step (h) comprises producing the pattern by stereolithography from a resin.

29. A method as claimed in claim 24 wherein the CAD definition comprises a plurality of articles to be produced interconnected by a runner system.

30. A method as claimed in claim 24 wherein step (i) comprises producing the investment casting mould by repeatedly dipping the pattern in a ceramic slurry.

31. A method as claimed in claim 24 wherein step (i) comprises producing the investment casting mould by making a mould to define the external shape of the investment casting mould and injecting a ceramic slurry into a space defined between the pattern and the mould.

32. A method as claimed in claim 31 comprising making the mould by stereolithography from a resin.

33. A method as claimed in claim 24 wherein step (l) comprises producing a temperature gradient across the investment casting mould to directionally solidify the molten metal.

34. A method as claimed in claim 33 wherein step (l) comprises selecting a single crystal of metal to grow into the investment casting mould.

35. A method as claimed in claim 34 wherein step (i) comprises making a restriction in the investment casting mould to select a single crystal.

36. A method as claimed in claim 26 wherein the CAD definition is selected from the group consisting of a definition of a blade or a definition of a vane.

37. A method as claimed in claims 24 wherein step (b) comprises producing a finite element thermal model of the casting process and solidification behavior.

* * * * *